(12) United States Patent
Hokai et al.

(10) Patent No.: US 12,479,472 B2
(45) Date of Patent: Nov. 25, 2025

(54) MOVING BODY CONTROL SYSTEM AND MOVING BODY CONTROL METHOD

(71) Applicant: TOYOTA JIDOSHA KABUSHIKI KAISHA, Toyota (JP)

(72) Inventors: Keisuke Hokai, Gotemba (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 18/454,452

(22) Filed: Aug. 23, 2023

(65) Prior Publication Data
US 2024/0124018 A1 Apr. 18, 2024

(30) Foreign Application Priority Data
Oct. 17, 2022 (JP) ................. 2022-166333

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01); *B60W 30/146* (2013.01); *B60W 50/0097* (2013.01); *B60W 60/0015* (2020.02); *B60W 2420/408* (2024.01); *B60W 2554/20* (2020.02);
(Continued)

(58) Field of Classification Search
CPC ....... B60W 2420/408; B60W 2554/20; B60W 2554/4041; B60W 2554/80; B60W 2556/20; B60W 2556/40; B60W 2556/50; B60W 30/09; B60W 30/0956; B60W 30/143; B60W 30/146; B60W 50/0097; B60W 60/0011; B60W 60/0015
See application file for complete search history.

(56) References Cited

U.S. PATENT DOCUMENTS 10,106,154 B2 * 10/2018 Nguyen Van ......... B60W 30/08
11,458,993 B2 * 10/2022 Brown ............... G01C 21/3815
(Continued)

FOREIGN PATENT DOCUMENTS

JP 2000242898 A * 9/2000
JP 2013185940 A * 9/2013
(Continued)

*Primary Examiner* — Babar Sarwar
(74) *Attorney, Agent, or Firm* — Sughrue Mion, PLLC

(57) ABSTRACT

A moving body control system executes a localization process that estimates a position of a moving body based on sensor-detected information and feature object map information indicating a position of a feature object. The moving body control system executes driving assist control based on the estimated position of the moving body. A first range includes the estimated position of the moving body and becomes larger as reliability of the localization process becomes lower. A first future range is at least a part of an expected passing range of the first range. When an obstacle is present in the first range or the first future range, the moving body control system makes the moving body decelerate or stop. When no obstacle is present in the first range or the first future range, the moving body control system continues the driving assist control.

5 Claims, 6 Drawing Sheets

(51) Int. Cl.
  *B60W 30/095* (2012.01)
  *B60W 30/14* (2006.01)
  *B60W 50/00* (2006.01)

(52) U.S. Cl.
  CPC . *B60W 2554/4041* (2020.02); *B60W 2554/80* (2020.02); *B60W 2556/20* (2020.02); *B60W 2556/40* (2020.02); *B60W 2556/50* (2020.02)

(56) References Cited

U.S. PATENT DOCUMENTS

| | | | | |
|---|---|---|---|---|
| 11,872,987 | B2* | 1/2024 | Kim | B60W 60/0011 |
| 11,945,470 | B2* | 4/2024 | Oltmann | B60W 10/184 |
| 12,139,165 | B2* | 11/2024 | Zhao | G05D 1/0295 |
| 2018/0059661 | A1* | 3/2018 | Sato | B60W 40/04 |
| 2019/0088136 | A1* | 3/2019 | Nagata | G08G 1/163 |
| 2019/0279006 | A1* | 9/2019 | Ozawa | G01S 13/931 |
| 2022/0081005 | A1* | 3/2022 | Brown | G08G 1/162 |
| 2023/0303069 | A1* | 9/2023 | Fukui | B60W 30/0956 |
| 2023/0331260 | A1* | 10/2023 | Hitakatsu | B60W 60/0059 |
| 2025/0010885 | A1* | 1/2025 | Srivastav | G01S 17/931 |

FOREIGN PATENT DOCUMENTS

| | | |
|---|---|---|
| JP | 2016-192028 A | 11/2016 |
| JP | 2018-32321 A | 3/2018 |
| JP | 2021-6431 A | 1/2021 |

\* cited by examiner

MOVING BODY CONTROL SYSTEM AND MOVING BODY CONTROL METHOD

CROSS-REFERENCES TO RELATED APPLICATION

The present disclosure claims priority to Japanese Patent Application No. 2022-166333, filed on Oct. 17, 2022, the contents of which application are incorporated herein by reference in their entirety.

TECHNICAL FIELD

The present disclosure relates to a technique for controlling a moving body that executes a localization process (self-position estimation process).

BACKGROUND ART

Patent Literature 1 discloses a control system for an autonomous driving vehicle. In this technique, an autonomous driving reliability value is calculated based on accuracy of self-position estimation. When the autonomous driving reliability value becomes equal to or less than a reference value, an autonomous driving termination request is notified to a driver.

LIST OF RELATED ART

Patent Literature 1: Japanese Laid-Open Patent Application No. JP-2018-032321

SUMMARY

A localization process for estimating a position of a moving body is known. The position of the moving body estimated by the localization process is used for, for example, driving assist control for assisting driving of the moving body (e.g., autonomous driving control). Therefore, when accuracy of the localization process (i.e., reliability of the localization process) decreases, it is conceivable to suspend the driving assist control. However, suspending the driving assist control more than necessary causes a decrease in travel efficiency of the moving body.

An object of the present disclosure is to provide a technique capable of improving continuity of driving assist control that is performed based on a result of a localization process in a moving body.

A first aspect of the present disclosure relates to a moving body control system for controlling a moving body.

The moving body control system includes:
one or more processors; and
one or more memory devices configured to store feature object map information indicating a position of a feature object.

The one or more processors are configured to:
acquire sensor-detected information detected by a sensor mounted on the moving body;
execute a localization process that estimates a position of the moving body based on the sensor-detected information and the feature object map information; and
execute driving assist control that assists driving of the moving body based on the estimated position of the moving body.

A first range includes the estimated position of the moving body and becomes larger as reliability of the localization process becomes lower.

A first future range is at least a part of an expected passing range of the first range.

The one or more processors are further configured to:
determine whether or not an obstacle is present in the first range or the first future range;
make the moving body decelerate or stop when the obstacle is present in the first range or the first future range; and
continue the driving assist control when no obstacle is present in the first range or the first future range.

A second aspect relates to a moving body control method for controlling a moving body.

The moving body control method includes:
acquiring sensor-detected information detected by a sensor mounted on the moving body;
executing a localization process that estimates a position of the moving body based on the sensor-detected information and feature object map information indicating a position of a feature object; and
executing driving assist control that assists driving of the moving body based on the estimated position of the moving body.

A first range includes the estimated position of the moving body and becomes larger as reliability of the localization process becomes lower.

A first future range is at least a part of an expected passing range of the first range.

The moving body control method further includes:
determining whether or not an obstacle is present in the first range or the first future range;
making the moving body decelerate or stop when the obstacle is present in the first range or the first future range; and
continuing the driving assist control when no obstacle is present in the first range or the first future range.

According to the present disclosure, the first range or the first future range that becomes larger as the reliability of the localization process becomes lower is set. When an obstacle is present in the first range or the first future range, safety control that makes the moving body decelerate or stop is executed. On the other hand, when there is no obstacle in the first range or the first future range, the driving assist control continues. That is, even when the reliability of the localization process decreases, the driving assist control continues as long as travel safety of the moving body is ensured. Since the driving assist control is not suspended more than necessary, continuity of the driving assist control is improved. In addition, since the continuity of the driving assist control is improved, a travel efficiency of the moving body is also improved.

DETAILED DESCRIPTION

The present disclosure relates to control of a moving body. Examples of the moving body include a vehicle and a robot. The moving body may be capable of autonomous travel. The vehicle may be an autonomous vehicle. As an example, a case where the moving body is a vehicle will be considered in the following description. In the case of generalization, "vehicle" in the following description is replaced with "moving body."

1. Overview of Vehicle Control System 1-1. Configuration Example

Figure 1:
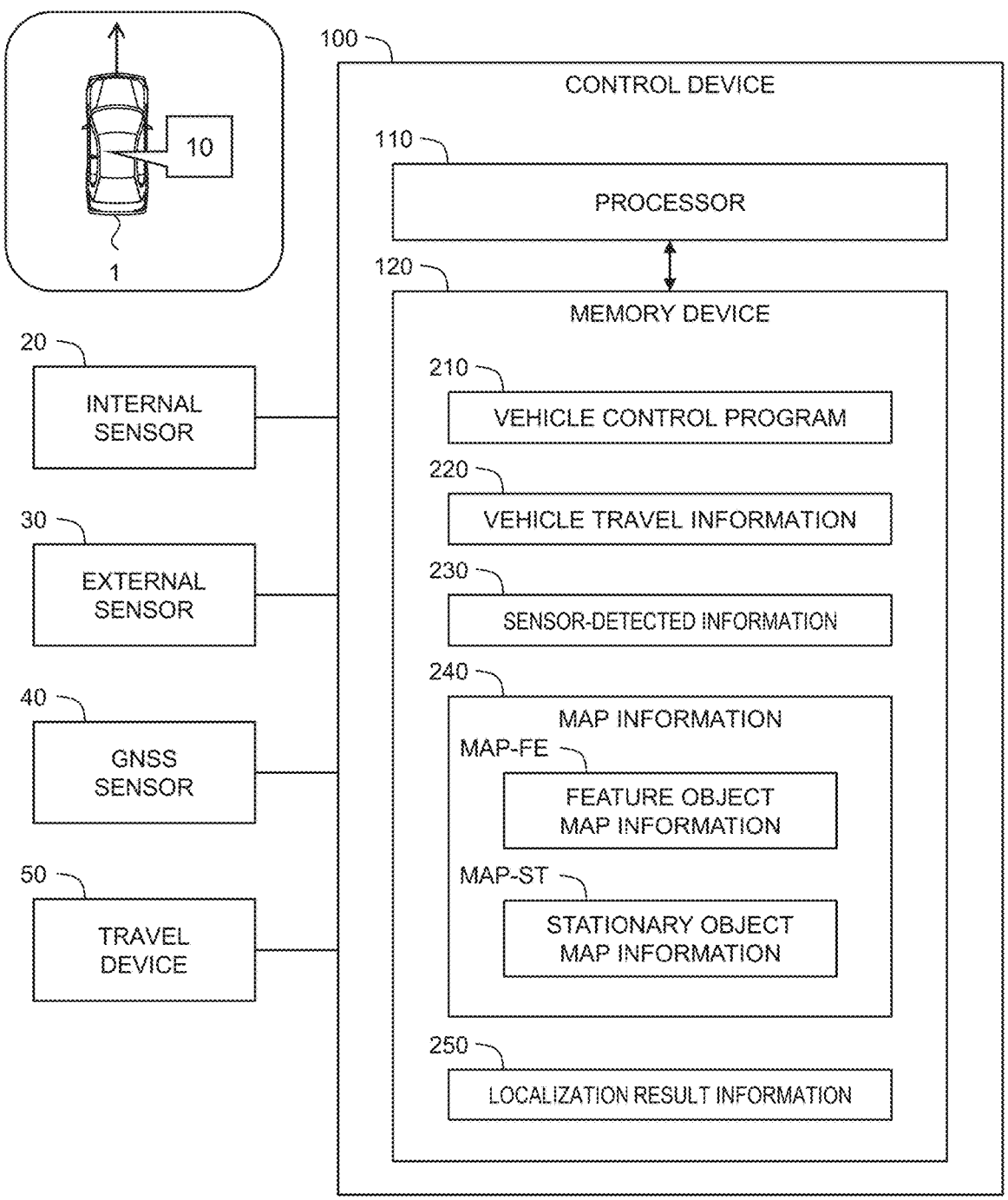
FIG. 1 is a block diagram showing an overview of a vehicle control system according to an embodiment.

FIG. 1 is a block diagram showing an overview of a vehicle control system 10 according to the present embodiment. The vehicle control system 10 controls the vehicle 1. The vehicle control system 10 includes an internal sensor 20, an external sensor 30, a global navigation satellite system (GNSS) sensor 40, a travel device 50, and a control device 100.

The internal sensor 20 is mounted on the vehicle 1 and detects a travel state of the vehicle 1. Examples of the internal sensor 20 include a vehicle speed sensor (wheel speed sensor), a steering angle sensor, an acceleration sensor, and a yaw rate sensor.

The external sensor 30 is mounted on the vehicle 1 and detects a situation around the vehicle 1. Examples of the external sensor 30 include a laser imaging detection and ranging (LIDAR), a camera, and a radar.

The travel device 50 includes a steering device, a driving device, and a braking device. The steering device steers wheels. The driving device generates a driving force. The braking device generates a braking force.

The control device 100 is a computer that controls the vehicle 1. The control device 100 includes one or more processors 110 (hereinafter, simply referred to as processor 110) and one or more memory devices 120 (hereinafter, simply referred to as memory device 120). The processor 110 executes various processes. For example, the processor 110 includes a central processing unit (CPU). The memory device 120 stores a variety of information. Examples of the memory device 120 include a volatile memory, a nonvolatile memory, a hard disk drive (HDD), a solid state drive (SSD), and the like. Typically, control device 100 is mounted on vehicle 1. Alternatively, a part of the control device 100 may be disposed in an external device outside the vehicle 1 to remotely control the vehicle 1.

The memory device 120 stores a vehicle control program 210, vehicle travel information 220, sensor-detected information 230, map information 240, localization result information 250, and the like.

The vehicle control program 210 is a computer program for controlling the vehicle 1. A variety of processing by the control device 100 may be implemented by the processor 110 executing the vehicle control program 210. The vehicle control program 210 may be recorded on a non-transitory computer-readable recording medium.

The vehicle travel information 220 is information detected by the internal sensor 20 and indicates a travel state of the vehicle 1. Examples of the travel state of the vehicle 1 include a vehicle speed, a steering angle, an acceleration, a yaw rate, and the like.

The sensor-detected information 230 is information detected by the external sensor 30. For example, the sensor-detected information 230 includes point cloud information obtained by LIDAR. As another example, the sensor-detected information 230 may include an image captured by a camera.

Furthermore, the sensor-detected information 230 includes object information related to an object around the vehicle 1. Examples of the object around the vehicle 1 include a pedestrian, another vehicle, a white line, a road structure, an obstacle, and a feature object FE. The feature object FE is an object (land-mark) used in localization process to be described later. Examples of the feature object FE include a lane, a curb, a pole, a utility pole, a signboard, a sign, and a corner of a building. The feature object FE can also be referred to as a "characteristic amount." The object information indicates a relative position and a relative speed of an object with respect to the vehicle 1. For example, it is possible to recognize an object and acquire a relative position and a relative speed of the object based on point group information obtained by the LIDAR. As another example, an image obtained by a camera may be analyzed to recognize and identify an object and calculate a relative position of the object.

The map information 240 includes a general navigation map. The map information 240 may indicate a lane arrangement or a road shape. Further, the map information 240 includes "feature object map information MAP-FE" and "stationary object map information MAP-ST." The feature object map information MAP-FE indicates the position (absolute position) of the feature object FE in the absolute coordinate system. The feature object map information MAP-FE is used in a localization process to be described later. The stationary object map information MAP-ST indicates the position (absolute position) of the stationary object ST in the absolute coordinate system. The stationary object ST is, for example, an immovable road structure such as a wall or a guardrail. The stationary object map information MAP-ST is used in a continuation determination process of the driving assist control described later.

1-2. Localization Process (Self-Position Estimation Process)

The processor 110 executes a localization process for estimating the position (absolute position) of the vehicle 1. The position of the vehicle 1 will hereinafter be referred to simply as "vehicle position." The initial value of the vehicle position is obtained by, for example, the GNSS sensor 40.

The processor 110 acquires the vehicle travel information 220, calculates a movement amount (displacement amount) of the vehicle 1 based on the steering angle and the vehicle speed of the vehicle 1, and estimates a rough vehicle position based on the movement amount. The method of estimating the vehicle position based on the steering angle and the vehicle speed is also called "dead reckoning."

The processor 110 acquires the sensor-detected information 230, and recognizes (extracts) the feature object FE around the vehicle 1 based on the sensor-detected information 230. The object information indicates a relative position of the recognized feature object FE with respect to the vehicle 1. By combining the vehicle position obtained by dead reckoning and the relative position of the recognized feature object FE, the absolute position of the recognized feature object FE is calculated. On the other hand, the absolute position of the feature object FE is registered in the feature object map information MAP-FE. The processor 110 corrects the vehicle position so that the absolute position of the recognized feature object FE coincides with the absolute position of the feature object FE obtained from the feature object map information MAP-FE as much as possible. That is, the processor 110 corrects the vehicle position by comparing the recognition result of the feature object FE by the external sensor 30 with the feature object map information MAP-FE.

The processor 110 can continuously acquire a highly accurate vehicle position by repeatedly performing the position estimation by dead reckoning and the position correction described above.

The localization result information 250 indicates a result of the localization process. Specifically, the localization result information 250 indicates the vehicle position estimated by the localization process. The localization result information 250 may further indicate reliability of localization process to be described later.

1-3. Driving Assist Control

The processor 110 executes vehicle travel control for controlling travel of the vehicle 1. The vehicle travel control includes steering control, acceleration control, and deceleration control. The processor 110 executes vehicle travel control by controlling the travel device 50 (the steering device, the driving device, and the braking device).

The processor 110 executes driving assist control for assisting driving of the vehicle 1. The driving assist control automatically performs at least one of steering, acceleration, and deceleration without requiring a driving operation by the driver. Examples of such driving assist control include autonomous driving control, risk avoidance control, and lane keeping control. In the driving assistance control, the processor 110 generates a target path (target trajectory) of the vehicle 1 based on the vehicle travel information 220, the sensor-detected information 230 (object information), the map information 240, and the localization result information 250 (vehicle position information). For example, the target route is generated so as to be along the center position of the lane. As another example, the target route is generated so as to avoid an obstacle in front of the vehicle 1. Then, the processor 110 executes the vehicle travel control such that the vehicle 1 follows the target route.

In order to ensure the accuracy of the driving assist control, the accuracy of the vehicle position, that is, the reliability of the localization process is important.

2. Reliability of Localization Process

Figure 2:
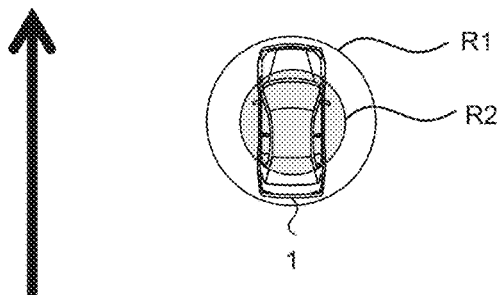
FIG. 2 is a conceptual diagram for explaining reliability of a localization process.
Figure 2:
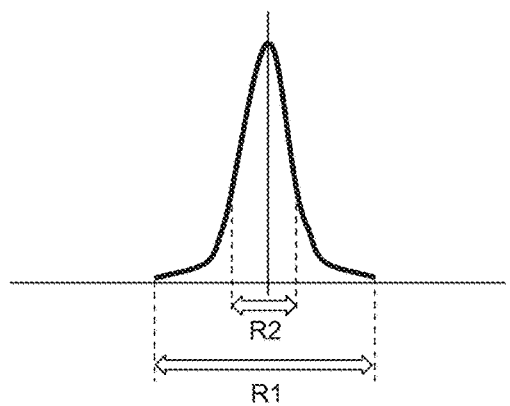
Figure 2:
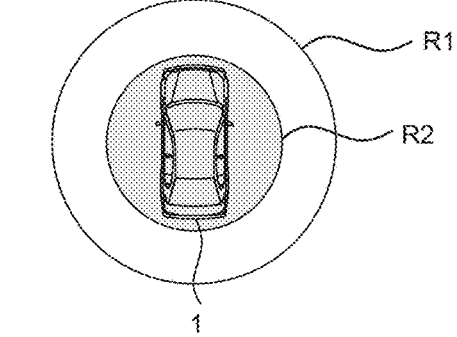
Figure 2:
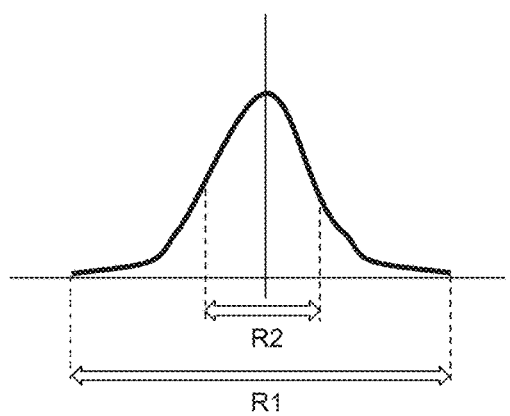
Figure 2:
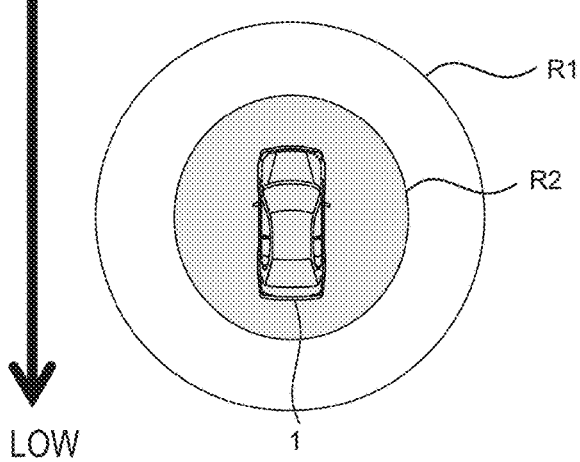
Figure 2:
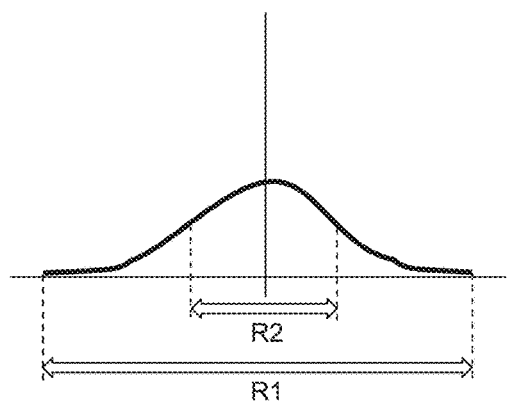

FIG. 2 is a conceptual diagram for explaining reliability of localization process. Various methods for calculating the reliability have been proposed. In the example shown in FIG. 2, a probability density distribution is defined for the vehicle position estimated by the localization process. The smaller the variance of the probability density distribution, the higher the reliability of the localization process. Conversely, the greater the variance of the probability density distribution, the lower the reliability of the localization process.

For example, a filter (e.g., particle filter, Kalman filter, UKF, etc.) may be used in the localization process. For example, when a particle filter is used, a large number of particles are scattered within the error range of the internal sensor 20. Further, the likelihood is calculated for each particle based on the matching result when it is assumed that the vehicle 1 is located at the position of each particle. Then, the weighted average of the particle positions calculated by the weight according to the likelihood of each particle is estimated as the vehicle position. Also, the variance of the distribution of the particle positions is calculated. The variance reflects the reliability of the localization process.

A "first range R1" is a range that reflects the reliability of the localization process. More specifically, the first range R1 is a range that includes the vehicle position estimated by the localization process and becomes larger as the reliability of the localization process becomes lower. For example, it is assumed that the variance of the probability density distribution of the vehicle position estimated by the localization process is represented by σ 2. The first range R1 is smaller as the variance σ 2 is smaller, and the first range R1 is larger as the variance σ 2 is larger. For example, the first range R1 is a range of 3 σ from the vehicle position. It can be said that the first range R1 is a range including estimation errors of the vehicle position.

3. Continuation Determination Process of Driving Support Control

When the reliability of the localization process decreases, the driving assist control may be suspended. However, suspending the driving assist control more than necessary causes a decrease in the travel efficiency of the vehicle 1. Therefore, in the present embodiment, the processor 110 does not uniformly suspend the driving assist control even if the reliability of the localization process decreases. In order to determine whether to continue or suspend the driving assist control, the processor 110 takes into account the driving safety in addition to the reliability of the localization process. Specifically, the processor 110 checks whether or not the travel safety is ensured, and continues the driving assist control when the travel safety is ensured even in a case where the reliability of the localization process is lowered. Since the driving assist control is not suspended more than necessary, the continuity of the driving assist control is improved. In addition, since the continuity of the driving assist control is improved, the travel efficiency of the moving body is also improved.

The process for determining whether or not to continue the driving assist control is hereinafter referred to as "continuation determination process." Some specific examples of the continuation determination process will be described below.

3-1. First Example

Figure 3:
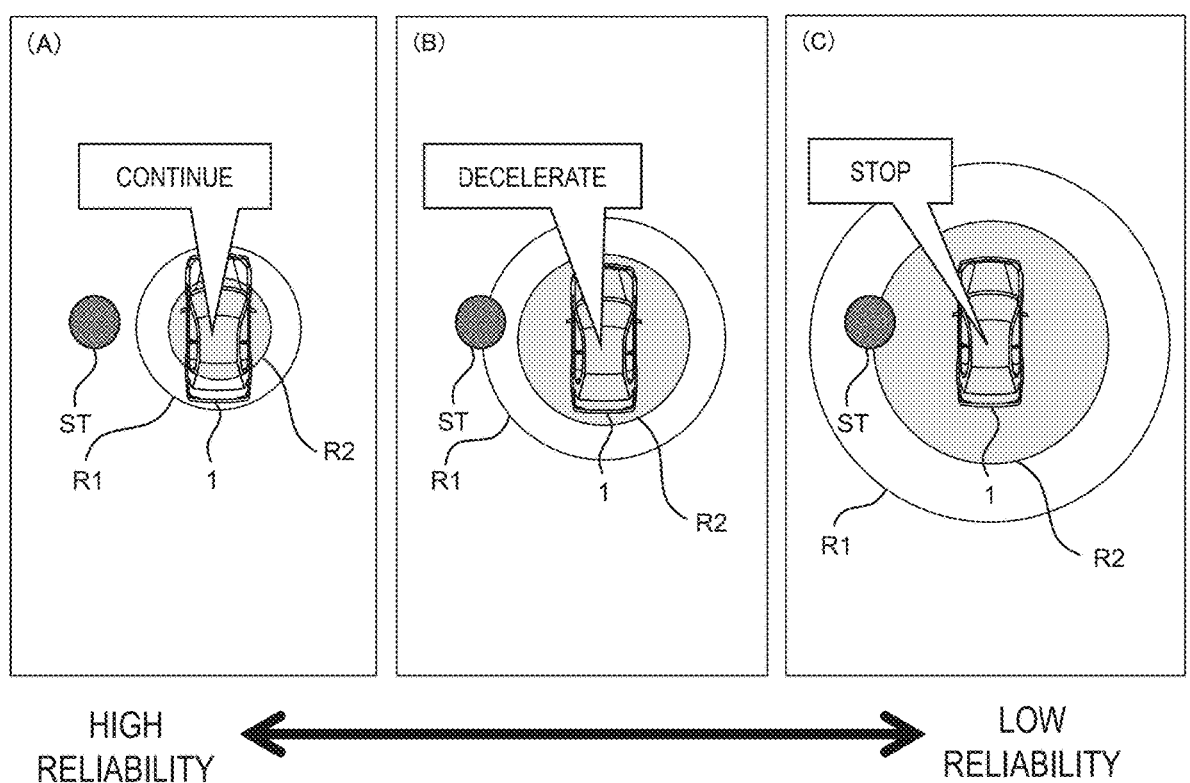
FIG. 3 is a conceptual diagram for explaining a first example of a continuation determination process of driving assist control according to an embodiment.

FIG. 3 is a conceptual diagram for explaining a first example of continuation determination process. In the first example, the continuation determination process is performed on the basis of the above-described first range R1 and the position of the stationary object ST present in the vehicle 1.

Specifically, the processor 110 recognizes a stationary object ST present around the vehicle 1 as an obstacle. The position (absolute position) of the stationary object ST in the absolute coordinate system is obtained from the stationary object map information MAP-ST described above. Therefore, the processor 110 can recognize the stationary object ST existing around the vehicle 1 as an obstacle based on the vehicle position (estimated position) and the stationary object map information MAP-ST. When there are a plurality of still objects ST, the processor 110 may recognize the still object ST closest to the vehicle 1 among the plurality of still objects ST as the obstacle.

In the case (A) of FIG. 3, there is no stationary object (obstacle) in the first range R1. The first range R1 is a range including estimation errors of the vehicle position, and the absence of the stationary object ST in the first range R1 means that the travel safety of the vehicle 1 is sufficiently ensured. Therefore, in this case, the processor 110 continues the driving assist control without suspending it. The higher the reliability of the localization process is, the smaller the first range R1 is and the lower the possibility that the stationary object ST exists in the first range R1 is. Therefore, as the reliability of the localization process becomes higher, the possibility that the driving assist control is continued becomes higher. However, even when the reliability of the localization process decreases and the first range R1 becomes large, if there is no stationary object in the first range R1, the driving assist control is continued because the travel safety is ensured. Thus, the continuity of the driving assist control is improved.

In the cases (B) and (C) of FIG. 3, a stationary object (obstacle) exists in the first range R1. The first range R1 is a range including estimation errors of the vehicle position, and the presence of the stationary object ST in the first range R1 means that the travel safety of the vehicle 1 is not necessarily sufficient. Therefore, the processor 110 executes the "safety control" for decelerating or stopping the vehicle 1 at an early stage. This improves safety.

A second range R2 narrower than the first range R1 may be used to determine whether to decelerate or stop the vehicle 1 in the safety control. For example, the first range R1 is a range of 3 σ from the vehicle position, and the second range R2 is a range of σ from the vehicle position. (B), the stationary object ST is present in the first range R1 but is not present in the second range R2. In the case (B), the processor 110 executes safety control for decelerating the vehicle 1. (C), the stationary object ST is present in the second range R2. In the case (C), the processor 110 executes the safety control for stopping the vehicle 1 at an early stage. The processor 110 may evacuate the vehicle 1 to a safe place such as a road shoulder and stop the vehicle 1.

Figure 4:
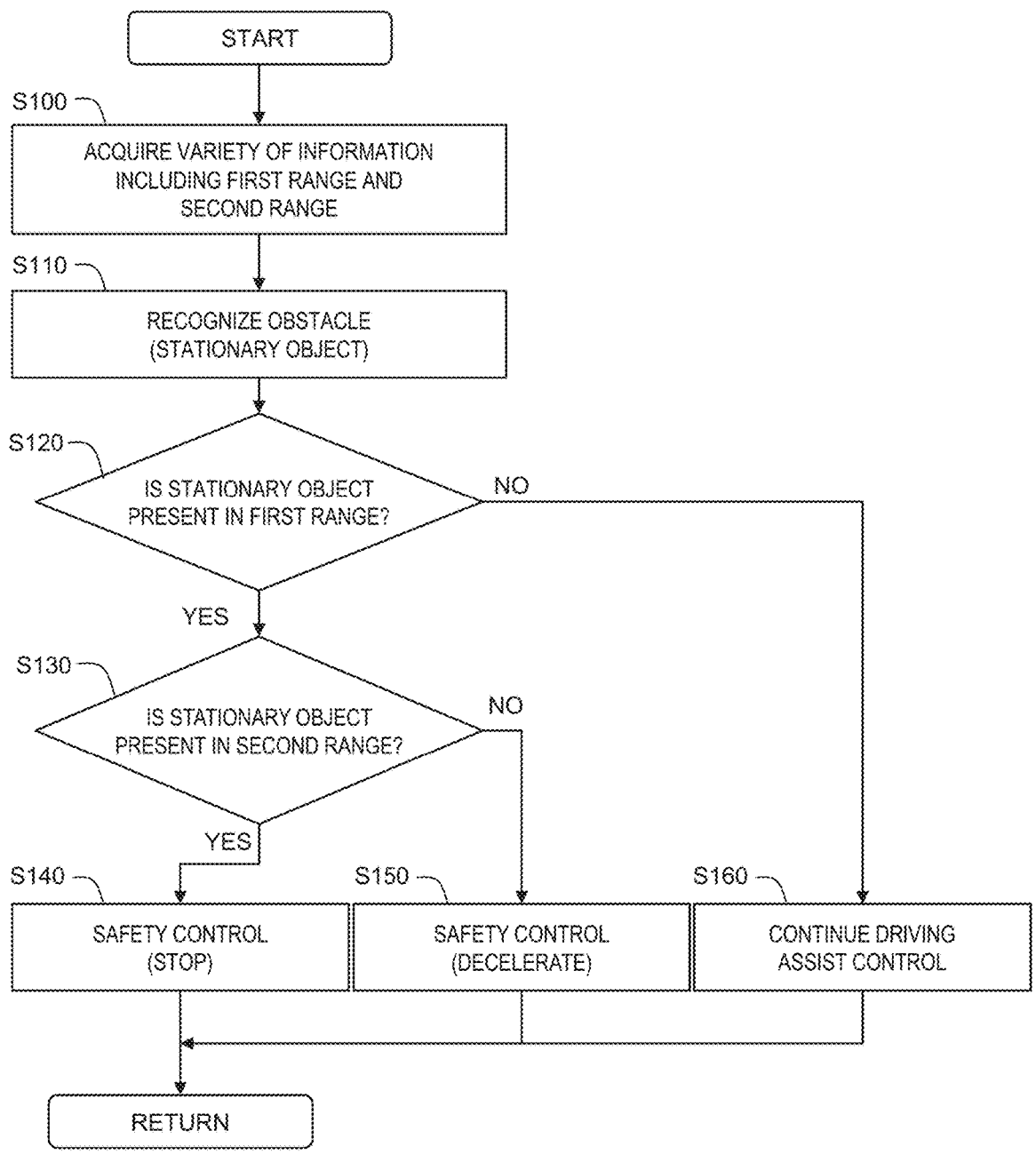
FIG. 4 is a flowchart showing a first example of a continuation determination process of driving assist control according to an embodiment.

FIG. 4 is a flowchart illustrating a first example of the continuation determination process. The flow related to the localization process is executed separately.

In Step S100, the processor 110 acquires a variety of information such as the stationary object map information MAP-ST and the localization result information 250 (vehicle position information and reliability information of the localization process). Thereafter, the processing proceeds to Step S110. The reliability information of the localization process includes information related to the first range R1 and the second range R2.

In Step S110, the processor 110 recognizes a stationary object ST existing around the vehicle 1 as an obstacle based on the vehicle position information and the stationary object map information MAP-ST. Thereafter, in Step S120, the processor 110 determines whether or not a stationary object ST is present in the first range R1. When it is determined that there is a still object in the first range R1 (Yes at Step S120), the processing proceeds to Step S130. Otherwise (Step S120; No), the processing proceeds to Step S160.

In Step S130, the processor 110 determines whether or not a stationary object ST is present in the second range R2. When it is determined that there is a still object in the second range R2 (Yes at Step S130), the processing proceeds to Step S140. Otherwise (Step S130; No), the processing proceeds to Step S150.

In Step S140, the processor 110 executes safety control for stopping the vehicle 1. In Step S150, the processor 110 executes safety control for decelerating the vehicle 1. In Step S160, the processor 110 continues the driving assist control.

3-2. Second Example

Figure 5:
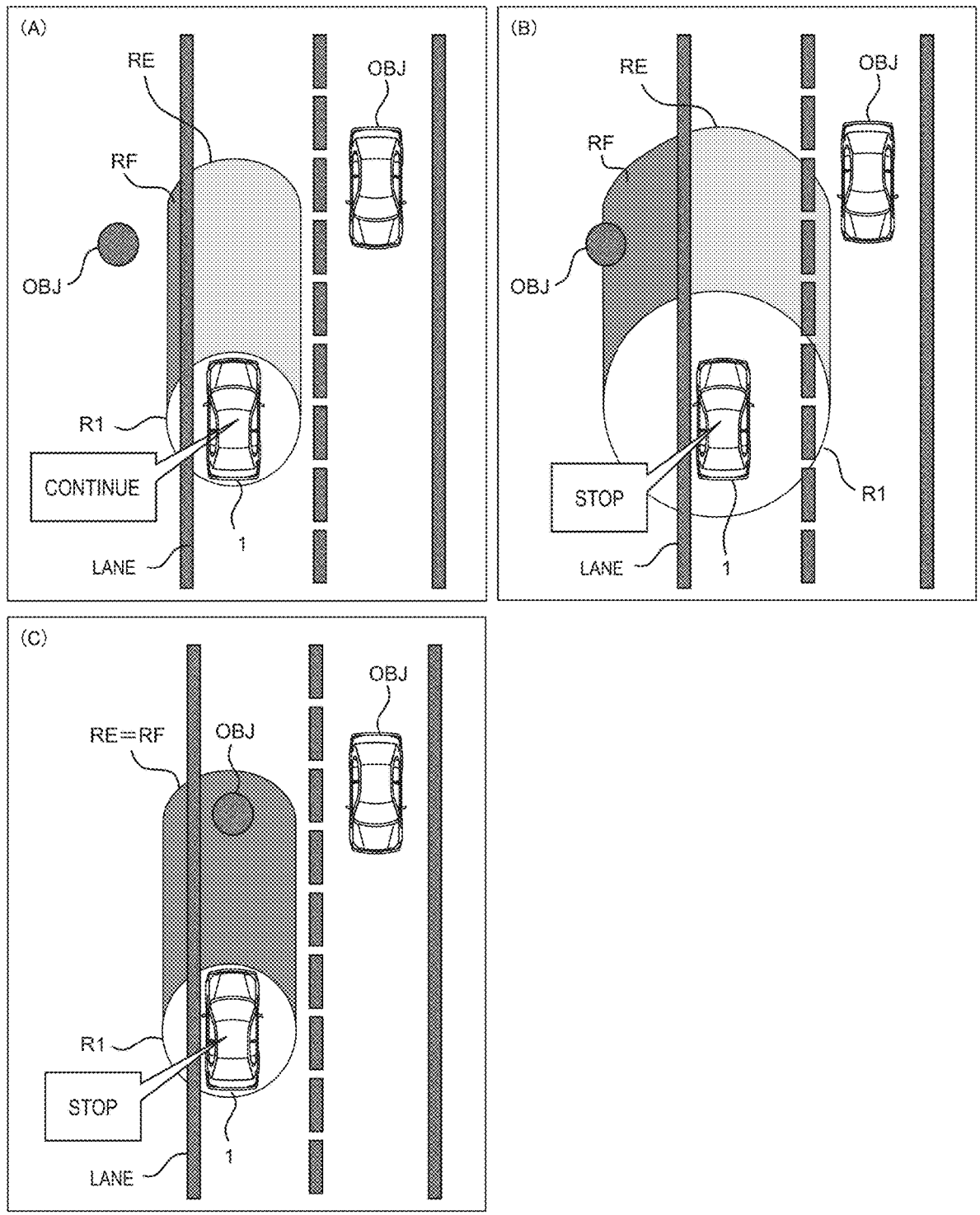
FIG. 5 is a conceptual diagram for explaining a second example of a continuation determination process of driving assist control according to an embodiment.

FIG. 5 is a conceptual diagram for explaining a second example of the continuation determination process. The "expected passing range RE" of the first range R1 is a range in which the first range R1 is expected to pass within a certain time from the current time. The first range R1 is, for example, a range of σ from the vehicle position. The certain time is, for example, about several seconds to 10 seconds. The expected passing range RE is obtained based on the travel direction or the target route and the speed of the vehicle 1.

The "first future range RF" is at least a part of the expected passing range RE. For example, the first future range RF is a range in the expected passing range RE and out of a lane in which the vehicle 1 is present. The lane in which the vehicle 1 is present can be recognized based on the left and right white lines of the vehicle 1. The positions of the left and right white lines of the vehicle 1 are obtained from the sensor-detected information 230 (object information). Alternatively, the range of the lane in which the vehicle 1 is present may be obtained from the map information 240.

In the second example, the continuation determination process is performed based on the first future range RF and the position of the obstacle OBJ present around the vehicle 1. The obstacle OBJ is, for example, a moving object such as a pedestrian or another vehicle. The processor 110 can recognize the obstacle OBJ present around the vehicle 1 based on the sensor-detected information 230 (object information).

In the cases (A) and (B) of FIG. 5, the first future range RF is a range in the predicted passing range RE and out of the lane in which the vehicle 1 is present. As the obstacle OBJ, a moving object such as a pedestrian on a sidewalk or an oncoming vehicle on an opposite lane is assumed.

In the case (A), the obstacle OBJ is not present in the first future range RF. In this case, the processor 110 determines that the travel safety of the vehicle 1 is ensured, and continues the driving assist control. As the reliability of the localization process becomes higher, the first future range RF becomes smaller and the possibility that the obstacle OBJ exists in the first future range RF becomes lower. Therefore, as the reliability of the localization process becomes higher, the possibility that the driving assist control is continued becomes higher. However, even if the reliability of the localization process decreases and the first future range RF increases, if the obstacle OBJ is not present in the first future range RF, the driving assist control is continued because the travel safety is ensured. Thus, the continuity of the driving assist control is improved.

In the case (B), the obstacle OBJ exists in the first future range RF. In this case, the processor 110 determines that the travel safety of the vehicle 1 is not necessarily sufficient, and executes "safety control" for decelerating or stopping the vehicle 1 at an early stage. For example, the processor 110 evacuates the vehicle 1 to a safe place such as a road shoulder and stops the vehicle 1. This improves safety.

As shown in case (C), it is also assumed that a pedestrian enters the roadway. Therefore, the first future range RF may include the lane in which the vehicle 1 is present. That is, the first future range RF may be the same as the expected passing range RE of the first range R1. In general, the first future range RF may be at least a part of the expected passing range RE of the first range R1. By performing the continuation determination process based on whether or not the obstacle OBJ is present in at least a part of the expected passing range RE of the first range R1, at least an effect is obtained.

Figure 6:
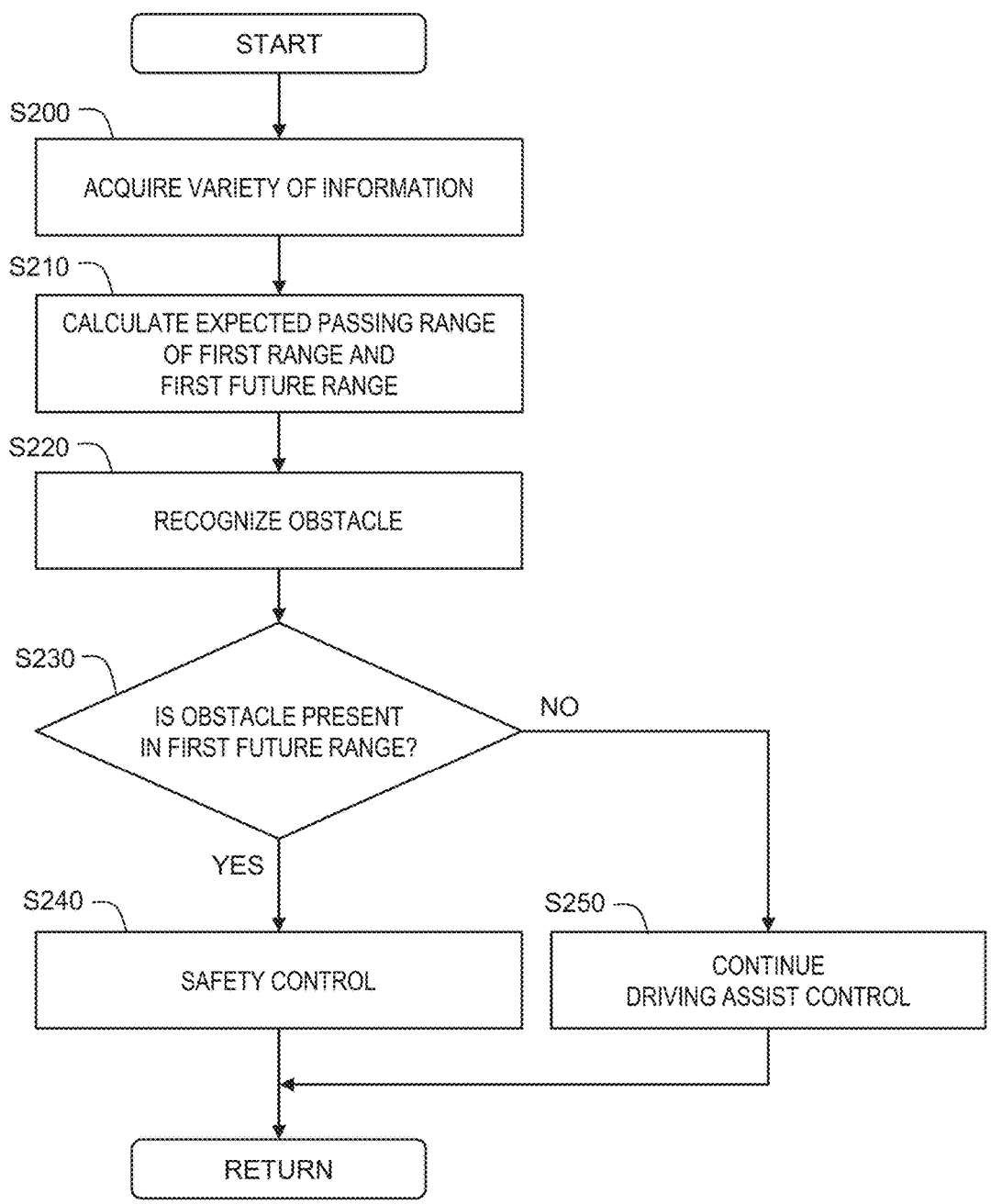
FIG. 6 is a flowchart showing a second example of a continuation determination process of driving assist control according to an embodiment.

FIG. 6 is a flowchart illustrating a second example of the continuation determination process. The flow related to the localization process is executed separately.

In Step S200, the processor 110 acquires a variety of information such as the sensor-detected information 230 and the localization result information 250 (vehicle position information and reliability information of the localization process). Thereafter, the processing proceeds to Step S210. The reliability information of the localization process includes information on the first range R1.

In Step S210, the processor 110 calculates the expected passing range RE and the first future range RF of the first range R1 based on a variety of information. Thereafter, in Step S220, the processor 110 recognizes the obstacle OBJ present in the periphery of the vehicle 1 based on the sensor-detected information 230 (object information). Thereafter, the processing proceeds to Step S230.

In Step S230, the processor 110 determines whether or not the obstacle OBJ is present in the first future range RF. When it is determined that the obstacle OBJ is present in the first future range RF (Step S230; Yes), the processing proceeds to Step S240. Otherwise (Step S230; No), the processing proceeds to Step S250.

In Step S240, the processor 110 executes safety control for decelerating or stopping the vehicle 1. Preferably, the processor 110 stops the vehicle 1. In Step S250, the processor 110 continues the driving assist control.

What is claimed is:

1. A moving body control system for controlling a moving body,
the moving body control system comprising:
one or more processors; and
one or more memory devices configured to store feature object map information indicating a position of a feature object, wherein
the one or more processors are configured to:
recognize a feature object around the moving body based on sensor-detected information detected by an external sensor mounted on the moving body to acquire object information indicating a relative position of the recognized feature object with respect to the moving body;
execute a localization process that estimates a position of the moving body based on a comparison between a position of the recognized feature object obtained from the object information and the position of the feature object obtained from the feature object map information; and
execute driving assist control that generates a target trajectory of the moving body and controls travel of the moving body so as to follow the target trajectory based on the estimated position of the moving body,
a first range includes the estimated position of the moving body and becomes larger as reliability of the localization process becomes lower,
a first future range is at least a part of an expected passing range of the first range, and
the one or more processors are further configured to:
determine whether or not an obstacle is present in the first range or the first future range;
make the moving body decelerate or stop when the obstacle is present in the first range or the first future range; and
continue the driving assist control when no obstacle is present in the first range or the first future range.

2. The moving body control system according to claim 1, wherein
the one or more memory devices are further configured to store stationary object map information indicating a position of a stationary object, and
the one or more processors are further configured to:
recognize the stationary object present around the moving body as the obstacle based on the estimated position of the moving body and the stationary object map information;
determine whether or not the stationary object is present in the first range;
make the moving body decelerate or stop when the stationary object is present in the first range; and
continue the driving assist control when the stationary object is not present in the first range.

3. The moving body control system according to claim 2, wherein
a second range is narrower than the first range, and
the one or more processors are further configured to:
make the moving body stop when the stationary object is present in the second range; and
make the moving body decelerate when the stationary object is present in the first range and is not present in the second range.

4. The moving body control system according to claim 1, wherein
the first future range is a range in the expected passing range of the first range and out of a lane in which the moving body is present, and
the one or more processors are further configured to:
recognize the obstacle present around the moving body based on the sensor-detected information;
determine whether or not the obstacle is present in the first future range;
make the moving body decelerate or stop when the obstacle is present in the first future range; and
continue the driving assist control when no obstacle is present in the first future range.

5. A moving body control method for controlling a moving body,
the moving body control method comprising:
recognizing a feature object around the moving body based on sensor-detected information detected by an external sensor mounted on the moving body to acquire object information indicating a relative position of the recognized feature object with respect to the moving body;
executing a localization process that estimates a position of the moving body based on a comparison between a position of the recognized feature object obtained from the object information and a position of a feature object obtained from feature object map information; and
executing driving assist control that generates a target trajectory of the moving body and controls travel of the moving body so as to follow the target trajectory based on the estimated position of the moving body, wherein
a first range includes the estimated position of the moving body and becomes larger as reliability of the localization process becomes lower,
a first future range is at least a part of an expected passing range of the first range, and
the moving body control method further comprises:
determining whether or not an obstacle is present in the first range or the first future range;
making the moving body decelerate or stop when the obstacle is present in the first range or the first future range; and
continuing the driving assist control when no obstacle is present in the first range or the first future range.

* * * * *